Figure 1:
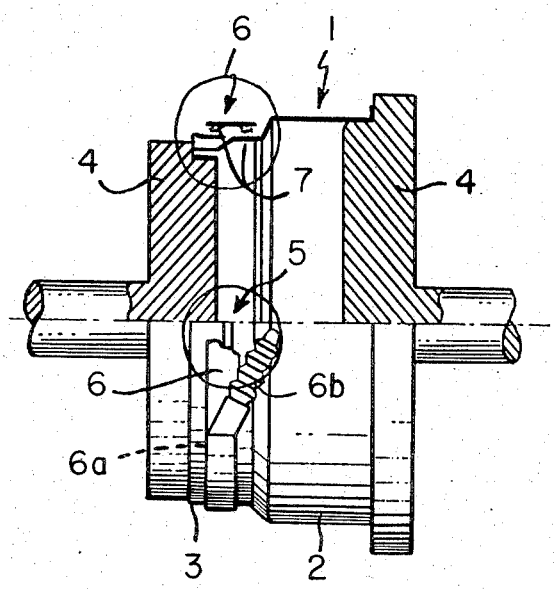

United States Patent [19]
Leblois

[11] 3,817,198
[45] June 18, 1974

[54] METHOD OF ASSEMBLING A METAL CONTAINER BY A SOLDERED STRIP

[75] Inventor: Charles Julien Martin Leblois, Douarnenez, France

[73] Assignee: Franpac, Douarnenez, France

[22] Filed: Oct. 31, 1972

[21] Appl. No.: 300,525

[30] Foreign Application Priority Data
Nov. 2, 1971  France .................. 71.39311

[52] U.S. Cl. ............... 113/120 Q, 113/1 E, 113/30, 228/48
[51] Int. Cl. .............................. B23k 1/18
[58] Field of Search ................. 113/120 Q, 1 E, 30; 220/53; 53/14, 133; 228/48

[56] References Cited
UNITED STATES PATENTS
949,406  2/1910  Stoker.................................. 228/48
3,555,764  1/1971  Dowling............................. 220/53
3,637,105  1/1972  Leblois .............................. 220/53

FOREIGN PATENTS OR APPLICATIONS
591,745  8/1947  Great Britain....................... 113/30

*Primary Examiner*—Richard J. Herbst
*Attorney, Agent, or Firm*—Ladas, Parry, Von Gehr, Goldsmith & Deschamps

[57] ABSTRACT

A method and apparatus for soldering a metal strip over the junction of the end and body of a metal container in which one end of the strip is secured to the container and the container is rotated to wind the strip around the container while maintaining the strip under constant tension. The strip is heated over a portion after the point of contact to melt a solder coating on the face of the strip which is against the container. After the strip has been soldered around the perimeter a strip is left unheated to provide a tear off tab.

12 Claims, 2 Drawing Figures

METHOD OF ASSEMBLING A METAL CONTAINER BY A SOLDERED STRIP

This invention relates to a method of assembling a metal container by a soldered strip.

In particular it relates to assembly of a lid or end of a container to the body thereof, both being made of metal, by means of a metal strip that overlaps the area where the body of the container and the top adjoin and that is secured by soldering to ensure an air-tight assembly of said container.

Containers of this type are extensively used for the sale of different products, specially food products preserved in sterile state, those containers being opened, when they are to be used, by tearing off the attached strip.

A metal strip can be easily soldered by methods used in the crafts such as by means of a manual soldering iron. Those methods are evidently incompatible with an industrial rate of production.

Attempts have been made to use the known method of soldering by a wheel: in this classical method the parts to be assembled are pressed one against the other by one or more heated wheels for example electrically heated wheels, which wheels, moving along the strip, ensure at the same time the fusion of the soldering composition and the pressure needed for spreading it between the parts to be soldered.

This method has certain disadvantages:

The soldering composition does not solidify immediately after passing the wheel or wheels and the strip, subjected by the wheel to a relatively high local pressure, tends, immediately after the passing of said wheel, to rise up carrying with it the soldering composition still in the process of fusion and causing to appear, after solidification, microfissures that detract from the tightness of the container.

The heating of the zone to be soldered is in practice, applied to specific points, which makes it necessary, if a quick rate of production is desired, to provide a very considerable heat flow that raises the temperature of the wheel and causes it to deteriorate rapidly.

The wheel tends quickly to become soiled, which reduces it thermal conductivity and detracts from the quality of the solder joint, especially since particles of dirt can fall off from the wheel and penetrate into the weld.

Finally, the difficulties connected with the guiding of the metal strip render it practically impossible to use a strip having a width of less than 5 mm.

It has also been proposed in British Pat. No. 591,745 for assembling cylindrical cans to make the can rotate before a heating plate and then before a pressure plate under which the soldering composition solidifies.

This method also has the principle disadvantages stated above.

That this method is not sufficiently reliable is evident in that there is provision for second passage if the soldering is not satisfactory in certain areas of the periphery.

Besides, this method of using a plate is very close to that of the wheel.

These two known methods do not permit a quick rate of production since the soldering composition solidifies in only a small portion of the perimeter of the can corresponding to the contact surface of the wheel or pressure plate.

Furthermore, said methods practically can only be used for cylindrical cans, and the profile and position of the wheel or plate must be adapted each time to the diameter of the can.

According to the invention there is provided a method of assembling a body and an end for a metal container by applying a metal strip to overlap the junction of can and end and securing the strip to the can by soldering comprising the steps of supplying a flexible metal strip having on one face thereof a solder composition, securing one end of said strip against said can at said junction with the solder face against the can, relatively rotating said strip and said can to wind the strip around the can, during the rotation maintaining a continuous tension on said strip, heating a portion of the strip extending from the point of contact with the can to fuse the solder composition, maintaining winding of the strip until at least a length equal to the perimeter of the can has been soldered to the can, and continuing winding without heating to provide a tear-off tab.

Thus one end of a flexible metal strip having on one of its faces at least one soldering filament, is applied and secured to the junction of body and end portion by the face of said metal strip provided with the soldering composition. There is exerted on the metal strip that has thus been secured a continuous traction, tangentially with respect to the can, in order to produce a relative rotation between the can and the metal strip so that the latter be wound, covering the junction, in the manner of a rope on a winch. The zone adjacent the point of tangency of the metal strip with the can is heated in proportion as the metal strip is wound on the can to fuse the soldering composition. The metal strip is soldered onto the can for a length at least equal to the perimeter of the junction. The winding of the strip around the can is prolonged without soldering for a space substantially longer than said perimeter so as to provide a tear-off tab on the final end of said metal strip.

Due to its inherent suppleness and to the continuous tension to which it is subjected, the strip closely attaches itself to the can without having the least tendency to rise and consequently without danger of forming microfissures in the solder.

The heating is effected in a relatively large zone without using a wheel, consequently avoiding the inconveniences of a heating at certain points and the disadvantages brought by the soiling of the wheel.

It has been observed that there are obtained extremely even soldered joints without fissures and also without rough edges. The explanation is that the body of the can behaves with regard to the strip like a winch in regard to which it is known that the radial pressures are constant and evenly distributed while the friction coefficient of the rope on the winch is near zero. Now, the solders made of tin and in liquid state give extremely low friction coefficients.

The pressure is kept constant throughout the cooling phase and the solidification of the soldering composition that take place in all of the portion of the perimeter of the can not subjected to heating.

The step of winding the strip around the can that plays the part of a winch constitutes at the same time both a very simple and a very reliable means of setting in place and guiding the strip, and it consequently permits a high rate of production and the use of a metal strip having a lesser width than the strip soldered by means of a wheel and in particular permits use of a strip of less than 5 mm. width. The provision of a tab at the end of the strip renders possible the opening of the can by just tearing off the metal strip.

The step of previously coating the strip that constitutes the metal strip with the soldering composition makes it possible to reduce the use of the latter in comparison to the known method in which the welding composition and the strip are separately applied to the can and the application and soldering operations are then simultaneous, for in this latter case the solder filaments must have enough mechanical resistance not to break, and consequently their cross section is definitely larger than that determined by the amount of soldering composition needed for assembling the can.

In a particular embodiment the fused soldering composition can be cooled in a zone that immediately follows the heating zone.

This cooling operation makes it possible to activate the solidification and therefore to reduce the duration of the operation of sealing each can without damaging the quality of the solder inasmuch as during this solidification the metal strip is in close contact with the can due to the continuous traction to which it is subjected.

In a further embodiment of the invention the strip is made of a malleable metal such as tin plate and has a thickness in the order of 1/10 millimeter. The use of such a thin strip to seal cans is disclosed in U.S. Pat. No. 3,637,105 to Leblois. Both by reason of the metal of which it is made and its thickness, such a strip has the flexibility required for being wound without difficulty and a close contact with the can allows it in particular to be adapted to the geometric defects of said can.

The strip includes, preferably, two solder filaments disposed lengthwise along the two edges thereof.

These two solder filaments on the edges of the strip are applied one to the body of the can and the other to the end, thus ensuring a reliable and tight seal while reducing to the strict minimum the soldered surface, which makes it possible easily to tear off the strip by hand without using special utensils such as keys or the like.

Figure 2:
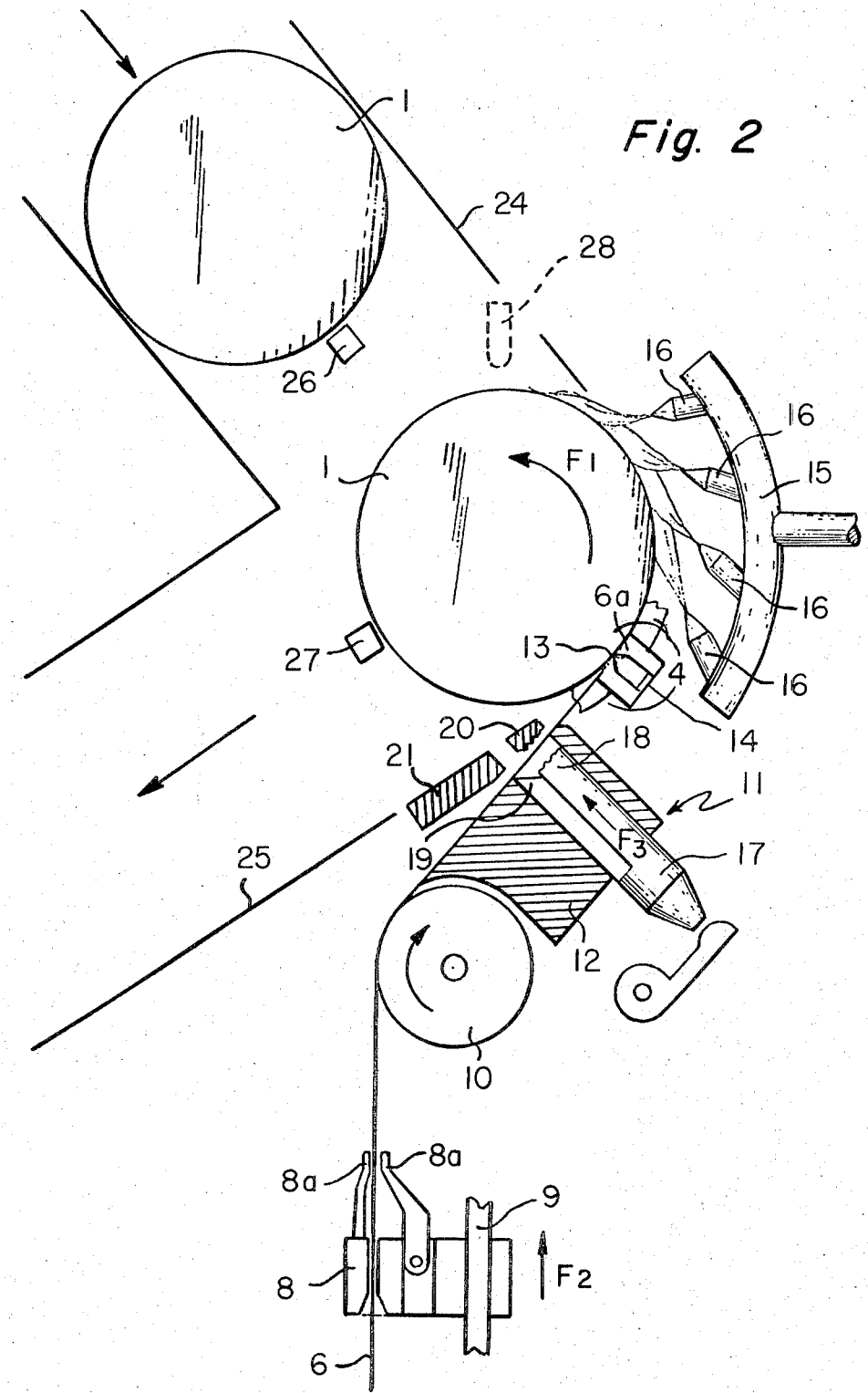

The method according to the invention has other features and numerous other advantages that will appear in the description relative to an embodiment described by way of example without it being intended to limit the method and having reference to the appended drawings wherein:

FIG. 1 diagrammatically shows a can mounted between two mandrels provided to make the can rotate, said can having a strip soldered at the junction between the body of the can and the top, said can being shown in section in the upper half of the figure and in an external view in the lower half;

FIG. 2 illustrates, also diagrammatically, the method of assemblage of said can.

A can 1 that has a circular cross section is formed, as shown in FIG. 1, by a body 2 and an end 3 made of tin plate. The can can be mounted in a manner known per se between two rotary mandrels 4 with which the can rotates as if it were integral with the mandrels, at least one of said mandrels being axially movable to make possible the insertion and removal of the can. The can is shown in FIG. 1 after the setting up of a sheet metal strip 6 that overlaps and covers the junction 5 between the body 2 and the end 3 and is soldered to said can by means of two parallel solder filaments 7 that have been previously provided on the inner face of the strip opposite to the can, said filaments being respectively soldered to the body 2 and to the end 3. The sheet metal strip 6 is soldered throughout the periphery of the can so as to cover completely the joint 5 and it extends as a non-soldered tab 6b.

The setting up and soldering of the metal strip on the can are illustrated in FIG. 2.

The sheet metal strip 6 that appears in the form of a continuous strip provided on one of its faces with two parallel soldering filaments and being supplied by a feeding means such as a reel, not shown, passes between the clamps 8a of a counterweight 8 vertically movable along a guiding stem 9. The strip then passes over a driving roll 10 such as a roll provided with a magnetic coupling means known per se that makes possible to control its rotation at will, thereafter it passes over the guide piece 12 of a cutting and forming device 11 that will be explained below and then is attached to the can, tangentially thereto, covering at the same time the junction between the body and the top. A pressure clamp 14 integral with one of the rotary mandrels 4 permits secural of the strip to said can at the beginning of each soldering operation. A heating device for the soldering composition constituted, for instance, by an oxyacetylenic conduit 15 provided with nozzles 16, is situated near the point of tangency 13 between the can 1 and the strip 6, beyond said point of tangency in relation to the direction of rotation of said can indicated by the arrow F1. The nozzles 16 of the conduit 15 are arranged at different angles so as to provide a heating sector that envelops the can over part of its periphery.

The cutting and forming device 11 includes the guide piece 12 against which the strip rests and in which is mounted a slider 17 that has at its end a marking mold 18 and a knife 19 that respectively cooperate with a stationary back mold 20 and an equally stationary matrix 21.

Slanted throats 24 and 25 provided with retractable retention fingers 26 and 27 provide for conveyance of the cans to be assembled to the welding station and the discharge of the assembled cans.

A can 1 is positioned between the mandrels 4, the forward end 6a of the metal strip 6 is tangentially applied to the can 1 and held thereon by the pressure clamp 14, the clamps 8a of the counterweight 8 that clamp said strip are caused to be closed so that the strip becomes subjected to the traction exerted thereon by the counterweight 8. The mandrels 4 that rotate in the direction indicated by the arrow F1 are made to rotate and the burners 16 of the pipe 15 are lit. The metal strip 6 carried along by the rotation of the can 1 winds around the latter like a rope on a winch carrying with it the counterweight 8 that slides from the bottom to the top according to the arrow F2 and consequently exerts a constant tension that applies the metal strip to the can with a constant force. When the strip 6 passes into the heating zone, that is, under the burners 16, its two soldering filaments 7 fuse, soldering its two edges on the body of the can and on the end. The liquid soldering composition ensuring a low friction coefficient between the metal strip and the can, there results a constant radial pressure along the winding of said strip that subsists as long as the solder composition is fused.

The metal strip then leaves the heating zone and the soldering composition solidifies thus ensuring the airtight assembly of the body and end of the can. The solder composition solidifies while the metal strip is subjected to the continuous and constant tension applied thereto by the counterweight 8. After the solidification of the soldering composition in the area of the end 6a of the strip, the opening and lateral release of the clamp 14 are effected. This operation usually intervenes when the can has effected a rotation comprised between ½ and ¾ turn. The can is caused to effect a rotation slightly above 360° so that the metal strip slightly covers for a distance of about 8 to 10 mm its end 6a so as to ensure a perfect seal throughout the periphery of the can. Then the gas from conduit 15 is caused to stop either by extinction or discharge, the rotation of the mandrels 4 is stopped, the counterweight 8 is withdrawn from the strip while the clamps 8a are caused to open and the counterweight is returned to its initial position. The slider 17 is then started and it moves rotatingly according to the arrow F3 so that its knife 19, interacting with the stationary matrix 21, cuts the metal strip 6 while the marking mold 18, cooperating with the back mold 20, stamps on the strip 6 striations or the like. The portion of the strip which has thus been cut and striated does not pass into the heating zone and consequently is not soldered on the can; this portion is the tab 6b represented in FIG. 1 that will subsequently serve for tearing off the strip when the can is to be opened. The tab can then be further secured to the strip at one point preferably at a soldering point by means, for instance, of an electric pulse electrode (not shown). The closing of the can being thus terminated, the mandrels 4 separate from each other, the retractable finger 27 disappears and the released can glides in the discharge throat 25. Immediately thereafter the retractable finger 26 disappears releasing in turn a new can 1 that is in the inlet throat 24. This new can takes its position between the mandrels 4 that close above it. The disk 10 is caused to rotate and it guides the new end of the strip tangentially to the can 1 so that a new soldering operation can be carried out.

The strip 6 is preferably obtained from a tin plate strip, that is, an extra-soft steel, laminated and reheated, coated by a high-purity tin film known as element quality. Its thickness is chosen essentially so as to ensure a great suppleness while imparting thereto enough strength normally to resist, without breaking, the strains to which it is subjected during the soldering operation and subsequently the tearing strain. Experience has taught that a thickness between 0.5/10 and 1.5/10 millimeter is entirely satisfactory.

The width of the metal strip 6 is selected according to the size of the space at the junction between the body of the can and the end, to the tearing effort needed for separating it from the can and to the thickness of the strip, also taking into consideration purely esthetical aspects. For sealing preserving cans of common sizes found on the market, it is possible to choose a metal strip having a thickness of 0.07 mm and a width of about 5 mm. Such a strip offers a relatively reduced soldering surface that requires, to be torn off, a traction force of not more than about 1.5 kg. Experience has shown that it is also possible to use without difficulty, a metal strip having a width of less than than 5 mm such as 4 mm. This reduction in the width of the strip makes possible the use of slightly thicker strips as for example 1.5/10 millimeter, always having the same traction force in relation to the tearing off.

The soldering composition used for the two filaments 7 is preferably constituted by a lead-tin alloy of the classical type used in the manufacture of preserve cans. Experience has shown that solder compositions containing 25 to 60 percent tin give the best results.

The weight of the counterweight 8 depends on the characteristics of the metal strip and of the can; for a strip 0.1 mm thick and 5 mm wide and a cylindrical can of circular cross section having a diameter of 70 mm, a counterweight of 2 to 6 kgs, preferably 4 kg, can be advantageously used.

Numerous variants can of course be made in the method described without departing from the limits of the invention.

Thus, for example, the end of the strip can be initially secured to the can by soldering at a certain point by means, for instance, of an electric-pulse electrode instead of using the pressure clamp 14.

The soldering composition could be heated by means of a pipe other than an oxyacetylenic pipe, or by electrical means.

A cooling after the heating zone could be effected by a jet of cold air or other cold gas fed from a nozzle 28.

The constant tension imparted to the metal strip in the course of the welding operation could be obtained by means other than a counterweight such as by adjustable tensioning disks.

It could be possible to provide on the inner face of the metal strip, instead of two solder filaments as it has been shown, just one layer coating this entire surface. Instead of a strip previously manufactured with a solder coating, solder can be applied immediately prior to contact with the can for example after roll 10.

Instead of a strip in the form of a continuous band, it could be possible to use a strip previously cut to the useful length, that is, having a length equal to the perimeter of the can plus the length of the tab. In this case, of course, the cutting operation by the knife 19 is not necessary.

The marking at the end 6b of the strip could be made using the clamps 8a of the counterweight 8; for this it is necessary that said clamps be shaped for this purpose and that they be controlled in such a manner that they clamp the strip at the level desired for effecting the marking. In this case, of course, the marking molds 18 and 20 are not used.

It is convenient to point out also that the method can be used not only on cans of circular cross section but also on cans of elliptical, oval, or other cross sections and even on cans of polygonal shape having a considerable enough number of sides, such as cans having 10 or 12 sides, the metal strip being flexible enough to be able to adapt to certain irregularities of the contour of the can.

Summarizing, numerous modifications or variations can be made in the method that has been described and illustrated without departing from the limits of the invention.

I claim:

1. A method of assembling a body and an end for a metal can by applying a metal strip to overlap the junction of can and end and securing the strip to the can by soldering comprising the steps of supplying a flexible metal strip having on one face thereof a solder composition, securing one end of said strip against said can at said junction with the solder face against the can said strip extending tangentially from the can, relatively rotating said strip and said can to wind the strip around the can, during the rotation maintaining a continuous tension along said strip to apply a constant radial pressure along the strip when in contact with the can, heating a portion of the strip extending along the can from the point of contact with the can to fuse the solder composition, maintaining winding of the strip under tension until at least a length equal to the perimeter of the can has been soldered to the can, maintaining said tension and radial pressure, until said solder has hardened and continuing winding without heating to provide a tear-off tab.

2. A method according to claim 1, wherein the solder composition is cooled in a zone at a point in rotation after the heating zone.

3. A method according to claim 1, wherein the metal strip supplied is made of a malleable metal having a thickness of about 1/10 millimeter.

4. A method according to claim 1, wherein the metal strip includes two parallel solder filaments arranged lengthwise along the two edges of said strip.

5. A method according to claim 1, wherein said welding composition is a tin-lead alloy.

6. A method according to claim 1, wherein the solder is heated by means of gas burners.

7. A method according to claim 2, wherein the cooling is effected by means of a jet of cold gas.

8. A method according to claim 1, wherein the end of the metal strip is secured to the can by clamping.

9. A method according to claim 1, wherein the tension on the metal strip is maintained by a counterweight clamped to the strip.

10. A method according to claim 1, wherein the final end of the strip is stamped with striations to render easier the manipulation of the tab.

11. A method according to claim 10, wherein the striations are applied by clamps for securing a counterweight to the strip to provide the tension.

12. A method according to claim 1, wherein the tab is attached to the metal strip at a point by solder.

* * * * *